US012335302B2

(12) United States Patent
Hiruta

(10) Patent No.: US 12,335,302 B2
(45) Date of Patent: Jun. 17, 2025

(54) SUSPICIOUS COMMUNICATION DETECTION APPARATUS, SUSPICIOUS COMMUNICATION DETECTION METHOD, AND SUSPICIOUS COMMUNICATION DETECTION PROGRAM

(71) Applicant: NEC Corporation, Tokyo (JP)

(72) Inventor: Shohei Hiruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/123,075

(22) Filed: Mar. 17, 2023

(65) Prior Publication Data

US 2024/0073240 A1 Feb. 29, 2024

(30) Foreign Application Priority Data

Aug. 31, 2022 (JP) .................................. 2022-138554

(51) Int. Cl.
*H04L 9/40* (2022.01)

(52) U.S. Cl.
CPC ...... *H04L 63/1441* (2013.01); *H04L 63/1416* (2013.01); *H04L 63/1425* (2013.01); *H04L 63/1433* (2013.01)

(58) Field of Classification Search
CPC ............. H04L 63/1441; H04L 63/1416; H04L 63/1425; H04L 63/1433
USPC .......................................................... 726/23
See application file for complete search history.

(56) References Cited

U.S. PATENT DOCUMENTS

| 8,639,625 | B1* | 1/2014 | Ginter | G06F 21/78 705/50 |
| 11,140,196 | B1* | 10/2021 | Bilge | H04L 63/145 |
| 2018/0115566 | A1* | 4/2018 | Azvine | H04L 63/0428 |
| 2018/0124085 | A1* | 5/2018 | Frayman | H04L 63/20 |
| 2019/0387012 | A1 | 12/2019 | Orihara et al. | |
| 2020/0389426 | A1* | 12/2020 | Enguehard | H04L 63/102 |
| 2020/0412556 | A1* | 12/2020 | Yoon | H04L 63/0876 |
| 2021/0258290 | A1* | 8/2021 | Gupta | H04L 63/0478 |

(Continued)

FOREIGN PATENT DOCUMENTS

| JP | 2006-253757 A | 9/2006 |
| JP | 2007-325293 A | 12/2007 |

(Continued)

*Primary Examiner* — Teshome Hailu

(57) ABSTRACT

A suspicious communication detection apparatus includes: a database; a machine learning model that receives features of an encrypted communication and that determines whether the encrypted communication is a suspicious communication; a determination part that refers to the database by using information about a received encrypted communication, enters obtained features about the received encrypted communication to the machine learning model, determines whether the received encrypted communication is a suspicious communication, and stores the determination result for the suspiciousness in the database; and a redetermination part that performs, based on a determination result of an encrypted communication from the inside of the organization to the outside of the organization, a redetermination on a determination result of an encrypted communication from the outside of the organization to the inside of the organization, the determination result being stored in the database.

15 Claims, 9 Drawing Sheets

(56) References Cited

U.S. PATENT DOCUMENTS

| | | |
|---|---|---|
| 2021/0306362 A1 | 9/2021 | Kubo et al. |
| 2022/0224716 A1* | 7/2022 | Salji .................... H04L 63/1441 |
| 2023/0156034 A1* | 5/2023 | Naidoo ............... H04L 63/1425 |
| | | 726/23 |

FOREIGN PATENT DOCUMENTS

| | | |
|---|---|---|
| JP | WO2018/159362 A1 | 9/2018 |
| WO | 2020/040027 A1 | 2/2020 |

* cited by examiner

FIG. 3

EXAMPLE OF ENCRYPTED COMMUNICATION INFORMATION MANAGEMENT TABLE

| ID | TIME | SOURCE IP ADDRESS | DESTINATION IP ADDRESS | SOURCE PORT NUMBER | DESTINATION PORT NUMBER | TRANSMISSION BYTE NUMBER | RECEPTION BYTE NUMBER | TRANSMISSION PACKET NUMBER | RECEPTION PACKET NUMBER | COMMUNICATION TIME | DIRECTION | DETERMINATION TARGET ID |
|---|---|---|---|---|---|---|---|---|---|---|---|---|
| 1 | 2022:01:03T00:00:00 | IP ADDRESS A | IP ADDRESS X | 60000 | 443 | 1,746 | 5,530 | 13 | 8 | 6 | inbound | F_in1 |
| 2 | 2022:01:03T00:00:00 | IP ADDRESS B | IP ADDRESS Y | 53425 | 443 | 434 | 262 | 5 | 3 | 1 | inbound | F_in2 |
| 3 | 2022:01:03T00:00:00 | IP ADDRESS C | IP ADDRESS Z | 56082 | 443 | 1,477 | 3,689 | 14 | 12 | 1 | inbound | F_in3 |
| 4 | 2022:01:03T00:00:01 | IP ADDRESS A | IP ADDRESS X | 60001 | 443 | 1,746 | 8,622 | 13 | 11 | 0 | inbound | F_in1 |
| 5 | 2022:01:03T01:00:00 | IP ADDRESS X | IP ADDRESS D | 50000 | 443 | 2,148 | 37,411 | 13 | 28 | 57 | outbound | F_out1 |

FIG. 4

EXAMPLE OF INBOUND ENCRYPTED COMMUNICATION FEATURE MANAGEMENT TABLE

EXAMPLE OF OUTBOUND ENCRYPTED COMMUNICATION FEATURE MANAGEMENT TABLE

FIG. 5

EXAMPLE OF INBOUND ENCRYPTED
COMMUNICATION FLAG MANAGEMENT TABLE

| DETERMINATION TARGET ID | SUSPICIOUS |
|---|---|
| F_in1 | 0 |
| F_in2 | 0 |
| F_in3 | 0 |

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 0 |

FIG. 6

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 1 |

EXAMPLE OF INBOUND ENCRYPTED
COMMUNICATION FLAG MANAGEMENT TABLE

| DETERMINATION TARGET ID | SUSPICIOUS |
|---|---|
| F_in1 | 1 |
| F_in2 | 1 |
| F_in3 | 0 |

FIG. 7

EXAMPLE OF INBOUND ENCRYPTED
COMMUNICATION FLAG MANAGEMENT TABLE

| DETERMINATION TARGET ID | SUSPICIOUS |
|---|---|
| F_in1 | 1 |
| F_in2 | 0 |
| F_in3 | 0 |

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 1 |

SUSPICIOUS COMMUNICATION DETECTION APPARATUS, SUSPICIOUS COMMUNICATION DETECTION METHOD, AND SUSPICIOUS COMMUNICATION DETECTION PROGRAM

REFERENCE TO RELATED APPLICATION

The present invention is based upon and claims the benefit of the priority of Japanese patent application No. 2022-138554, filed on Aug. 31, 2022, the disclosure of which is incorporated herein in its entirety by reference thereto.

FIELD

The present invention relates to a suspicious communication detection apparatus, a suspicious communication detection method, and a suspicious communication detection program.

BACKGROUND

The number of encrypted communications is increasing in the current communications. However, signatures of an intrusion detection system (IDS) cannot respond to encrypted communications, and therefore, alerts cannot be issued. Thus, a technique of determining whether a communication is an attack using an encrypted communication is demanded.

The existing encrypted communication analysis techniques can be generally divided in two kinds of known methods. In one kind of method, an encrypted communication is first decrypted at an exit and is next analyzed. The analyzed communication is next encrypted again. However, if an encrypted communication is analyzed after decrypted as in this technique, the communication performed while the encrypted communication is being decrypted is not secure. Thus, attackers have more opportunities to attack. In the other kind of method, an encrypted communication is analyzed by using information that has not been encrypted (e.g., a header or a TLS handshake). For example, patent literature 1 discusses a technique of extracting a source IP address from a header of an encrypted communication, calculating the reliability of the source IP address, and determining whether the encrypted communication is an attack or not. However, this technique of analyzing an encrypted communication by using information that has not been encrypted has a weak point in that attackers can easily avoid this technique. The attackers can use a different IP address and can also fake a normal TLS handshake.

PTL 1: Japanese Unexamined Patent Application Publication No. 2007-325293

SUMMARY

The disclosure of the above patent literature is incorporated herein in its entirety by reference thereto. The following analysis has been made by the present inventors.

Determining whether an encrypted communication is a suspicious communication without decrypting the encrypted communication has a problem with the determination accuracy. First, because the determination is performed without decrypting the encrypted communication, payload information cannot be used for the determination. Thus, when whether an encrypted communication is a suspicious communication is determined without decrypting the encrypted communication, this determination is performed based on statistical information.

This determination also has a problem in that the determination accuracy is low for inbound encrypted communications. According to preliminary experiment conducted on the determination, although a characteristic tendency has been seen in suspicious communications for offensive purposes in outbound encrypted communications, no characteristic tendency has been seen in suspicious communications for offensive purposes in inbound encrypted communications. Thus, there are cases in which the determination accuracy is low for inbound encrypted communications.

In view of the above problems, it is an object of the present invention to provide a suspicious communication detection apparatus, a suspicious communication detection method, and a suspicious communication detection program that contribute to determining whether an encrypted communication is a suspicious communication(s) without decrypting the encrypted communication.

In a first aspect of the present invention, there is provided a suspicious communication detection apparatus, including: a database in which information extracted from encrypted communications is managed separately as communications from an outside of an organization to an inside of the organization and as communications from the inside of the organization to the outside of the organization; a machine learning model that receives features of an encrypted communication and that determines whether the encrypted communication is a suspicious communication; a determination part that refers to the database by using information about a received encrypted communication, enters obtained features about the received encrypted communication to the machine learning model, determines whether the received encrypted communication is a suspicious communication(s), and stores the determination result for the suspiciousness in the database; and a redetermination part that performs, based on a determination result of an encrypted communication from the inside of the organization to the outside of the organization, a redetermination on a determination result of an encrypted communication from the outside of the organization to the inside of the organization, the determination result being stored in the database.

In a second aspect of the present invention, there is provided a suspicious communication detection method, including: causing an information processing apparatus, which includes a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication is a suspicious communication, to refer to the database by using information about a received encrypted communication; causing the information processing apparatus to enter obtained features about the received encrypted communication to the machine learning model; causing the information processing apparatus to determine whether the received encrypted communication is a suspicious communication and to store the determination result for the suspiciousness in the database; and causing the information processing apparatus to perform, based on a determination result of an encrypted communication from the inside of the organization to the outside of the organization, a redetermination on a determination result of an encrypted communication from the outside of the organization to the inside of the organization, the determination result being stored in the database.

In a third aspect of the present invention, there is provided a program, executed by an information processing apparatus, which includes a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication is a suspicious communication, the program including: referring to the database by using information about a received encrypted communication; entering obtained features about the received encrypted communication to the machine learning model; determining whether the received encrypted communication is a suspicious communication and storing the determination result for the suspiciousness in the database; and performing, based on a determination result of an encrypted communication from the inside of the organization to the outside of the organization, a redetermination on a determination result of an encrypted communication from the outside of the organization to the inside of the organization, the determination result being stored in the database. The program can be recorded in a computer-readable storage medium. The storage medium may be a non-transient storage medium such as a semiconductor memory, a hard disk, a magnetic recording medium, or an optical recording medium. The present invention can be embodied as a computer program product.

According to the individual aspects of the present invention, there are provided a suspicious communication detection apparatus, a suspicious communication detection method, and a suspicious communication detection program that contribute to determining whether an encrypted communication is a suspicious communication without decrypting the encrypted communication.

BRIEF DESCRIPTION OF THE DRAWINGS

FIG. 3 is a drawing illustrating an example of an encrypted communication information management table.

FIG. 4 is a drawing illustrating examples of encrypted communication feature management tables.

FIG. 5 is a drawing illustrating examples of encrypted communication flag management tables.

FIG. 6 is a drawing illustrating examples of suspicious flags.

FIG. 7 is a drawing illustrating an example of change of a suspicious flag.

EXAMPLE EMBODIMENTS

Figure 1:
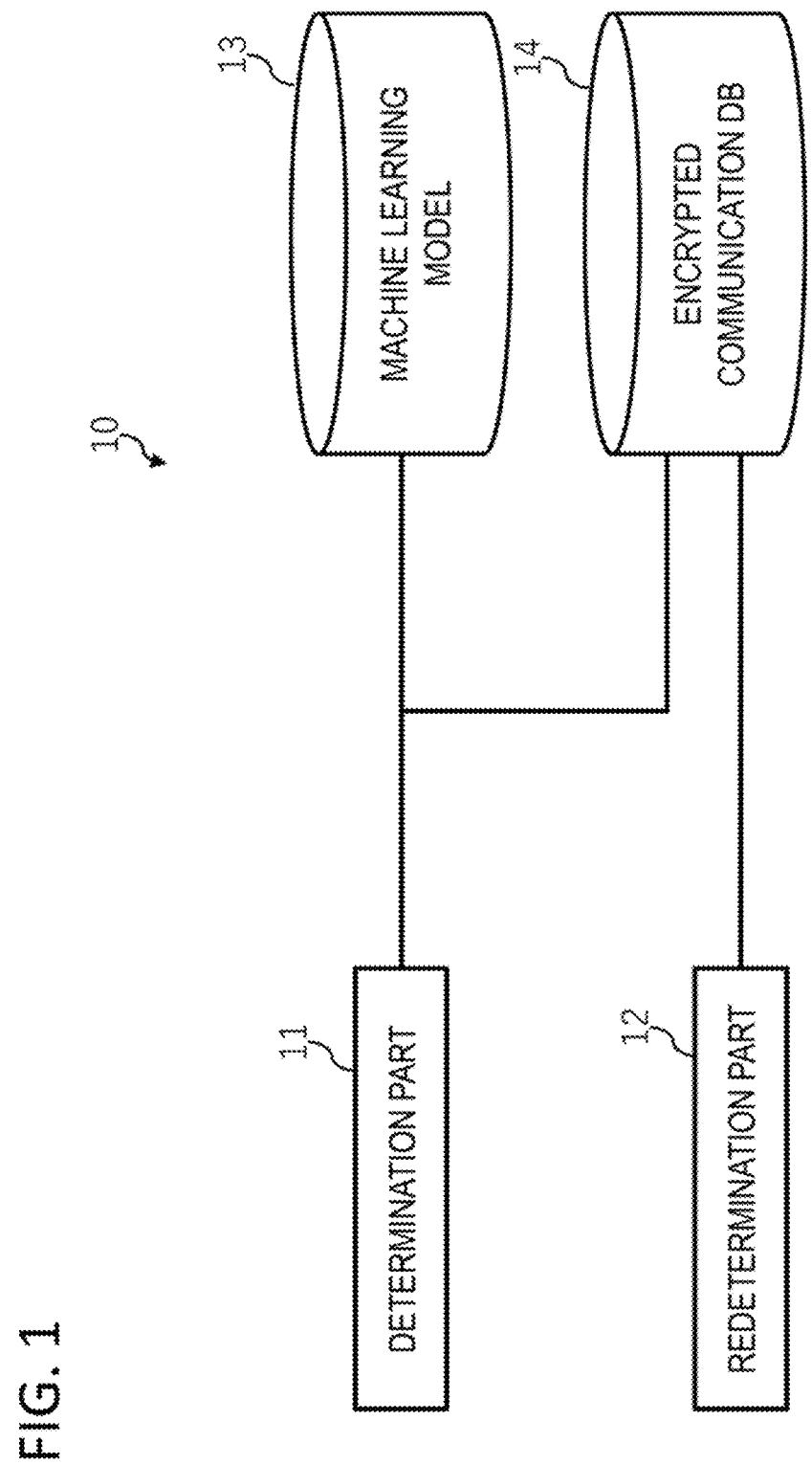
FIG. 1 is a schematic drawing illustrating a basic configuration according to an example embodiment of the present invention.

Hereinafter, an example embodiment of the present invention will be described with reference to the drawings. However, the present invention is not limited to the following example embodiment. In addition, in the drawings, the same or equivalent elements are denoted by the same reference characters, as needed. In addition, the drawings are schematic drawings, and therefore, it should be noted that the sizes, ratios, etc. of the individual elements may differ from the actual sizes, ratios, etc. An element in a drawing may have a portion whose size or ratio differs from that of the portion of the element in a different drawing.

[Suspicious Communication Detection Apparatus]

FIG. 1 is a schematic drawing illustrating a basic configuration according to an example embodiment of the present invention. As illustrated in FIG. 1, a suspicious communication detection apparatus 10 according to an example embodiment of the present invention includes a determination part 11, a redetermination part 12, and a machine learning model 13, and an encrypted communication database 14.

The encrypted communication database 14 is a database that manages information extracted from encrypted communications. The machine learning model 13 is a determination algorithm that receives features of an encrypted communication(s) and that determines whether the encrypted communication(s) is a suspicious communication(s).

The determination part 11 refers to the database by using information about a received encrypted communication(s), enters the obtained features about the received encrypted communication(s) to the machine learning model, and determines whether the received encrypted communication(s) is a suspicious communication(s). The redetermination part 12 performs, based on a determination result(s) of an encrypted communication(s) from the inside of an organization to the outside of the organization, a redetermination(s) on an encrypted communication(s) from the outside of the organization to the inside of the organization.

Hereinafter, configurations and functions of the determination part 11, the redetermination part 12, the machine learning model 13, and the encrypted communication database 14 will be described based on specific examples.

Figure 2:
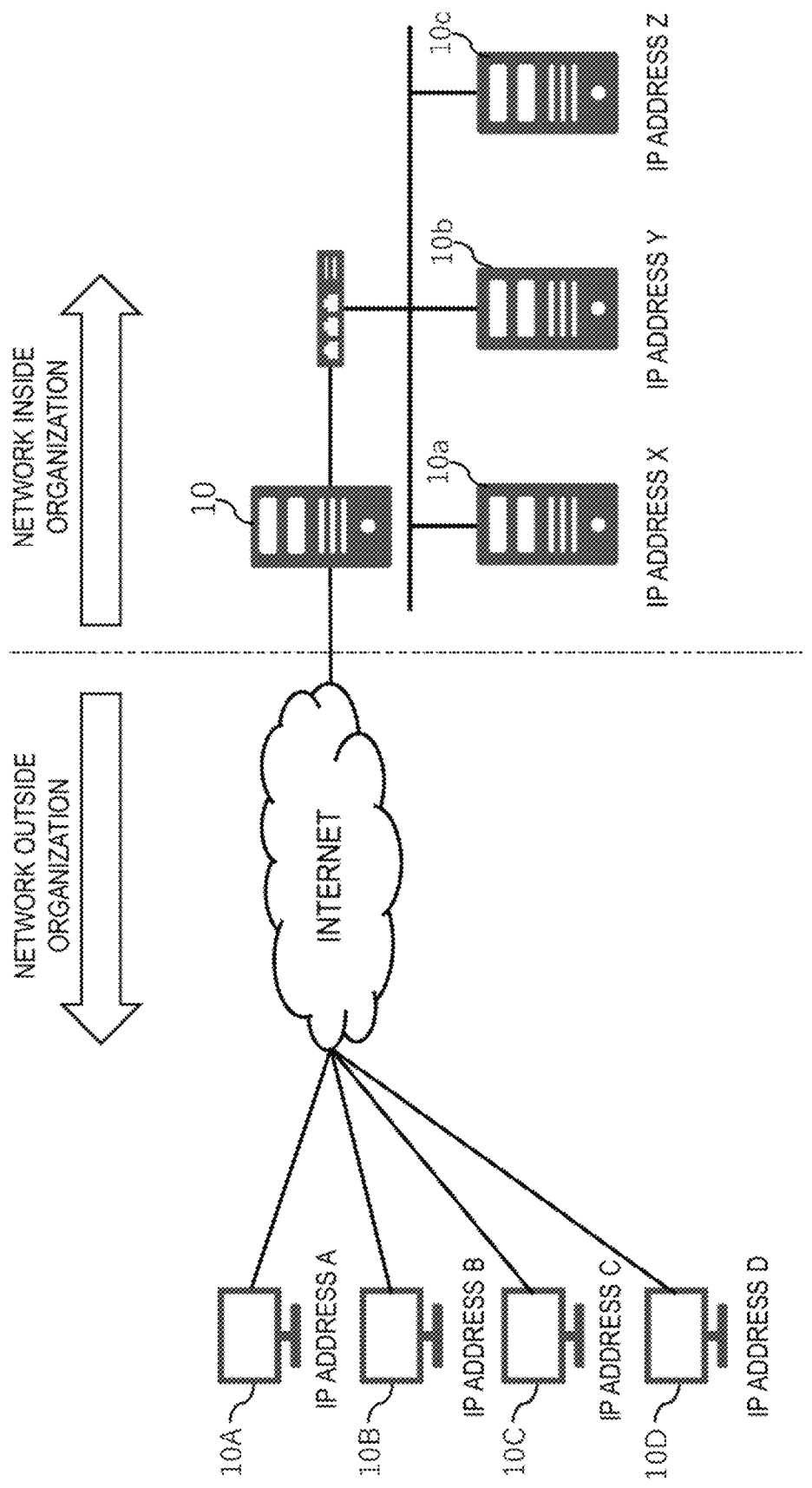
FIG. 2 is a schematic drawing illustrating an example of an environment in which a suspicious communication detection apparatus according to the example embodiment of the present invention is used.

FIG. 2 is a schematic drawing illustrating an example of an environment in which the suspicious communication detection apparatus according to the example embodiment of the present invention is used. As illustrated in FIG. 2, when information processing apparatuses 10a to 10c communicate with information processing apparatuses 10A to 10D connected to a network outside an organization via the Internet, the suspicious communication detection apparatus 10 according to the example embodiment of the present invention relays the communications at an entrance of a network inside the organization. The internal network belongs to the inside of the organization, and the external network belongs to the outside of the organization. The suspicious communication detection apparatus 10 receives a communication(s) between the internal network and the external network. In this example, IP addresses X to Z are allocated to the information processing apparatuses 10a to 10c connected to the internal network, respectively, and IP addresses A to D are allocated to the information processing apparatuses 10A to 10D connected to the external network, respectively. The suspicious communication detection apparatus 10 can determine whether a communication(s) is an inbound communication(s) or an outbound communication(s) based on these IP addresses. An inbound communication is a communication from the external network to the internal network, and an outbound communication is a communication from the internal network to the external network.

The encrypted communication database 14 includes an encrypted communication information management table that manages session information about encrypted communications, encrypted communication feature management tables that manage features generated from encrypted communications, and encrypted communication flag management tables that manage flags of encrypted communications determined as suspicious communications. FIG. 3 is a drawing illustrating an example of the encrypted communication information management table.

As illustrated in FIG. 3, an individual record in the encrypted communication information management table indicates session information, which is statistical information from the start of an encrypted communication to the end of the encrypted communication. A determination target identification (ID) is allocated per combination of a source IP address, a destination IP address, and a destination port number. Each record includes a time, a source IP address, a destination IP address, a source port number, a destination port number, a transmission byte number, a reception byte number, a transmission packet number, a reception packet number, a communication time, a direction, and a determination target ID.

Depending on the session direction of an encrypted communication, a different determination target ID is allocated to the encrypted communication. For example, if the source IP address is the IP address A, the destination IP address is the IP address X, and the destination port number is 443, this communication can be determined as an encrypted communication from the outside of the organization to the inside of the organization. Thus, an inbound determination target ID F_in1 is allocated to this communication.

FIG. 4 is a drawing illustrating examples of encrypted communication feature management tables. These encrypted communication feature management tables manage features generated from encrypted communications, and each record is associated with a determination target ID and holds features. As illustrated in FIG. 4, for example, the individual encrypted communication feature management table manages features, which are a maximum value, a minimum value, an average value, a median value, and a cumulative total value of each of the transmission byte number, the reception byte number, the transmission packet number, the reception packet number, and the communication time, per combination of a source IP address, a destination IP address, and a destination port number. In addition, the inbound communications are managed in one of the encrypted communication feature management tables illustrated in FIG. 4, and the outbound communications are managed in the other encrypted communication feature management table.

FIG. 5 is a drawing illustrating examples of encrypted communication flag management tables. The encrypted communication flag management tables manage flags of encrypted communications determined as suspicious communications. If an encrypted communication is determined as a suspicious communication, the suspicious flag of the encrypted communication is set to 1 in the corresponding one of the encrypted communication flag management tables. If an encrypted communication is not determined as a suspicious communication, the suspicious flag of this encrypted communication is set to 0. The inbound communications are managed in one of the encrypted communication flag management tables in FIG. 5, and the outbound communications are managed in the other encrypted communication flag management table.

As described above, the encrypted communication database 14 includes an encrypted communication information management table that manages session information about encrypted communications, encrypted communication feature management tables that manage features generated from encrypted communications, and encrypted communication flag management tables that manage flags of encrypted communications determined as suspicious communications. The determination part 11 can refer to the database by using information about a received encrypted communication and acquire the features of the received encrypted communication. In addition, the determination part 11 can determine whether an encrypted communication is a suspicious communication and can record the determination result in the corresponding one of the encrypted communication flag management tables. In addition, the encrypted communication database 14 provides information so that the redetermination part 12 can perform a redetermination on a determined result.

The machine learning model 13 receives the features of an encrypted communication and determines whether the encrypted communication is a suspicious communication. For example, the machine learning model 13 is a determination algorithm for performing this determination. Alternatively, the machine learning model 13 is a determination formula used for this determination. The features entered to the machine learning model 13 are features recorded in one of the encrypted communication feature management tables in the encrypted communication database 14. The determination part 11 refers to one of the encrypted communication feature management tables in the encrypted communication database 14 by using information about a received encrypted communication and acquires the features of the received encrypted communication. Next, the determination part 11 enters the acquired feature to the machine learning model 13.

The machine learning model 13 may be any machine learning model that can determine whether an encrypted communication is a suspicious communication upon receiving the features of the encrypted communication as input. For example, the machine learning model 13 may be a model that learns features of normal encrypted communications and determines that an encrypted communication indicating an outlier is a suspicious communication. Alternatively, the machine learning model 13 may be a model that learns features of suspicious encrypted communications and determines an encrypted communication that is similar to any one of these suspicious encrypted communications as a suspicious communication. Alternatively, the machine learning model 13 may be a model that learns normal encrypted communications and suspicious encrypted communications and performs, for example, binary classification.

The determination part 11 refers to the encrypted communication database 14 by using information about a received encrypted communication, enters the obtained features to the machine learning model 13, and determines whether the received encrypted communication is a suspicious communication. First, the determination part 11 refers to the encrypted communication information management table in the encrypted communication database 14 by using information about a received encrypted communication and acquires a determination target ID of the received encrypted communication. Next, the determination part 11 refers to the corresponding one of the encrypted communication feature management tables in the encrypted communication database 14 by using the acquired determination target ID and acquires the features of the received encrypted communication. Next, the determination part 11 enters the acquired features of the encrypted communication to the machine learning model 13 and determines whether the received encrypted communication is a suspicious communication.

After acquiring the result of the determination using the machine learning model 13, the determination part 11 refers to the inbound and outbound encrypted communication flag management tables and changes the suspicious flag associated with the determination target ID determined as a suspicious communication to 1. For example, if the encrypted communications having determination target IDs F_in1, F_in2, and F_out1 are determined as suspicious communications, the determination part 11 changes the suspicious flags of the encrypted communications having F_in1, F_in2, and F_out1 to 1, as illustrated in FIG. 6.

The redetermination part 12 performs, based on a determination result(s) of an encrypted communication(s) from the inside of the organization to the outside of the organization, a redetermination(s) on an encrypted communication(s) from the outside of the organization to the inside of the organization. The redetermination part 12 refers to the inbound encrypted communication flag management table in the encrypted communication database 14 and acquires a determination target ID (F_in) associated with 1 as the suspicious flag. Next, the redetermination part 12 refers to the encrypted communication information management table and acquires a destination IP address that matches the above determination target ID (F_in). In addition, the redetermination part 12 refers to the encrypted communication information management table and acquires a determination target ID (F_out) that matches the following conditions.

The direction field indicates "outbound"

The source IP address of F_out=the destination IP address of F_in

Next, the redetermination part 12 refers to the outbound encrypted communication flag management table and acquires the suspicious flag associated with the above determination target ID (F_out). Next, depending on the suspicious flag, the redetermination part 12 updates the value of the suspicious flag associated with the above determination target ID (F_out). If there is an F_out associated with 1 as the suspicious flag, the redetermination part 12 changes the suspicious flag associated with F_in to 1. If there is no F_out associated with 1 as the suspicious flag, the redetermination part 12 changes the suspicious flag associated with F_in to 0. For example, as illustrated in FIG. 6, if the suspicious flags of the encrypted communications associated with F_in1, F_in2, and F_out1 indicate 1, F_in1 and F_out1 match the above conditions. Thus, the redetermination part 12 maintains the suspicious flag 1 associated with F_in1 and changes the suspicious flag associated with F_in2 to 0, as illustrated in FIG. 7. That is, as a result of the redetermination, the encrypted communication associated with F_in2 and determined as a suspicious communication has been reviewed, and the suspicious flag has been changed to 0.

[Suspicious Communication Detection Method]

Next, a suspicious communication detection method according to the example embodiment of the present invention will be described. In the suspicious communication detection method according to the example embodiment of the present invention, an information processing apparatus, which includes a database that manages information extracted from encrypted communications and a machine learning model that receives features of an encrypted communication and determines whether this encrypted communication is a suspicious communication, refers to the database by using information about a received encrypted communication, enters the obtained features about the received encrypted communication to the machine learning model, determines whether the received encrypted communication is a suspicious communication, and performs, based on a determination result(s) of an encrypted communication(s) from the inside of the organization to the outside of the organization, a redetermination(s) on an encrypted communication(s) from the outside of the organization to the inside of the organization. The execution of the suspicious communication detection method is not limited to any apparatus configuration. However, for ease of description, the suspicious communication detection method will be described by using the configuration of the suspicious communication detection apparatus 10 illustrated in FIG. 1.

Figure 8:
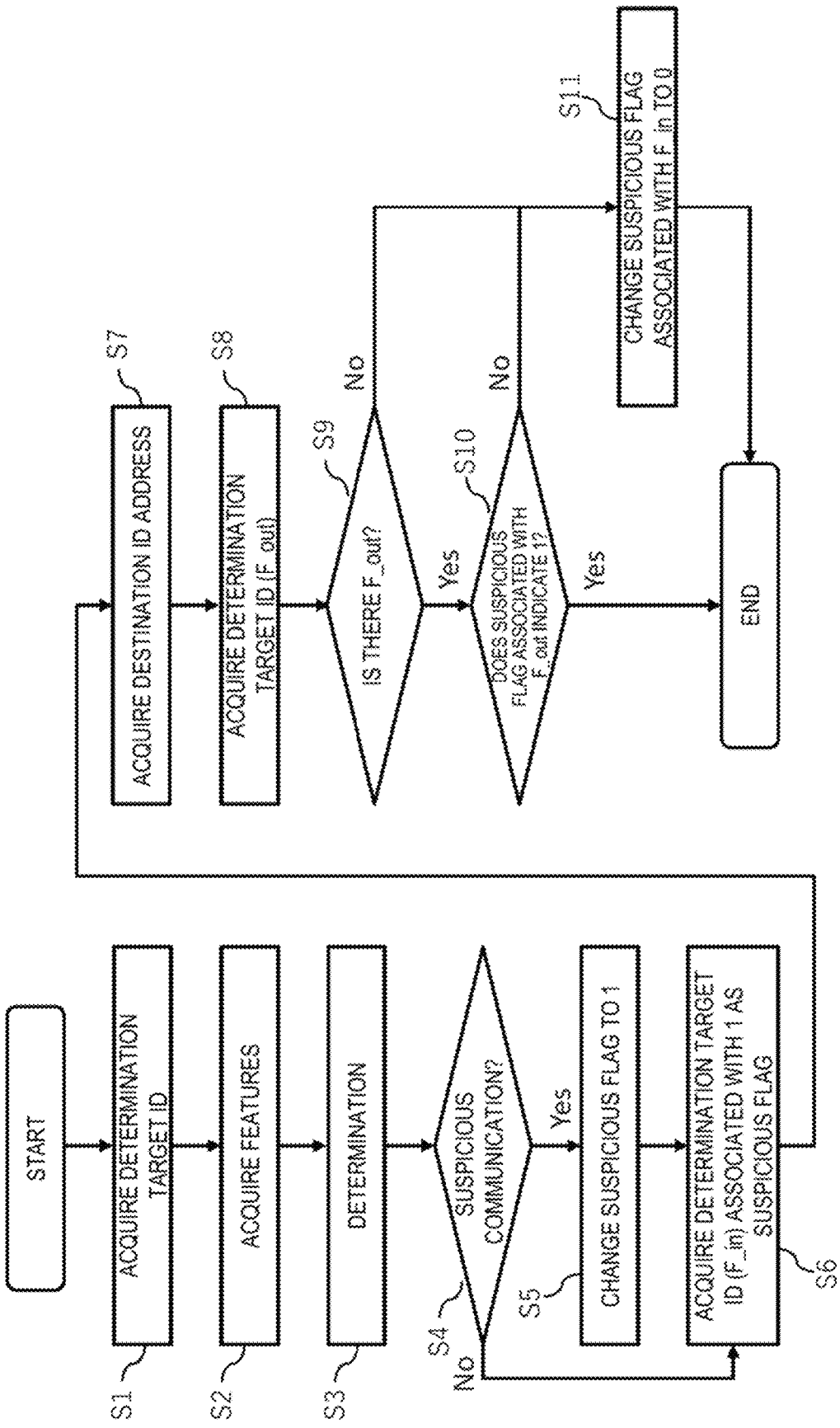
FIG. 8 is a flowchart illustrating a procedure of a suspicious communication detection method according to the example embodiment of the present invention.

FIG. 8 is a flowchart illustrating a procedure of the suspicious communication detection method according to the example embodiment of the present invention. As illustrated in FIG. 8, the procedure of the suspicious communication detection method includes acquisition of a determination target ID (step S1), acquisition of features (step S2), determination (step S3), determination of a suspicious or normal communication (step S4), change of a suspicious flag (step S5), acquisition of a determination target ID (F_in) associated with 1 as the suspicious flag (step S6), acquisition of a destination IP address (step S7), acquisition of a determination target ID (F_out) (step S8), determination of presence of a determination target ID (F_out) (step S9), determination of a suspicious flag associated with the determination target ID (F_out) (step S10), and change of a suspicious flag (step S11).

The determination part 11 refers to the encrypted communication database 14 by using information about a received encrypted communication, enters the obtained features about the received encrypted communication to the machine learning model 13, and determines whether the received encrypted communication is a suspicious communication. Specifically, the determination part 11 refers to the encrypted communication information management table in the encrypted communication database 14 by using information about a received encrypted communication and acquires a determination target ID (step S1). Next, the determination part 11 refers to the corresponding one of the encrypted communication feature management tables in the encrypted communication database 14 by using the determination target ID and acquires the features about the received encrypted communication (step S2). Next, the determination part 11 enters the obtained features about the received encrypted communication to the machine learning model 13 and determines whether the received encrypted communication is a suspicious communication (step S3). If the determination result indicates that the received encrypted communication is a suspicious communication (step S4; Yes), the determination part 11 changes the suspicious flag associated with the determination target ID in the corresponding encrypted communication flag management table in the encrypted communication database 14 to 1 (step S5). If the determination result indicates that the received encrypted communication is not a suspicious communication (step S4; No), the processing proceeds to redetermination processing.

The redetermination part 12 performs, based on a determination result(s) of an encrypted communication(s) from the inside of the organization to the outside of the organization, a redetermination(s) on an encrypted communication(s) from the outside of the organization to the inside of the organization. Specifically, the redetermination part 12 acquires a determination target ID (F_in) associated with 1 as the suspicious flag in one of the encrypted communication flag management tables in the encrypted communication database 14 (step S6). Next, the redetermination part 12 refers to the encrypted communication information management table in the encrypted communication database 14 and acquires a destination IP address associated with the determination target ID associated with 1 as the suspicious flag (step S7). Next, the redetermination part 12 refers to the encrypted communication information management table in the encrypted communication database 14 and acquires a determination target ID (F_out) associated with "outbound" in the direction field and satisfying "the source IP address of F_out=the destination IP address of F_in" (step S8).

If there is such determination target ID (F_out) (step S9; Yes), the redetermination part 12 refers to the other encrypted communication flag management table in the encrypted communication database 14 and determines whether the suspicious flag associated with the determination target ID (F_out) indicates 1. If the suspicious flag associated with the determination target ID (F_out) indicates 1 (step S10; Yes), the redetermination part 12 ends the redetermination processing. If there is no such determination target ID (F_out) (step S9; No) or if the suspicious flag associated with the determination target ID (F_out) does not indicate 1 (step S10; No), the redetermination part 12 changes the suspicious flag associated with the determination target ID (F_in) to 0 (step S11).

[Example of Hardware Configuration]

Figure 9:
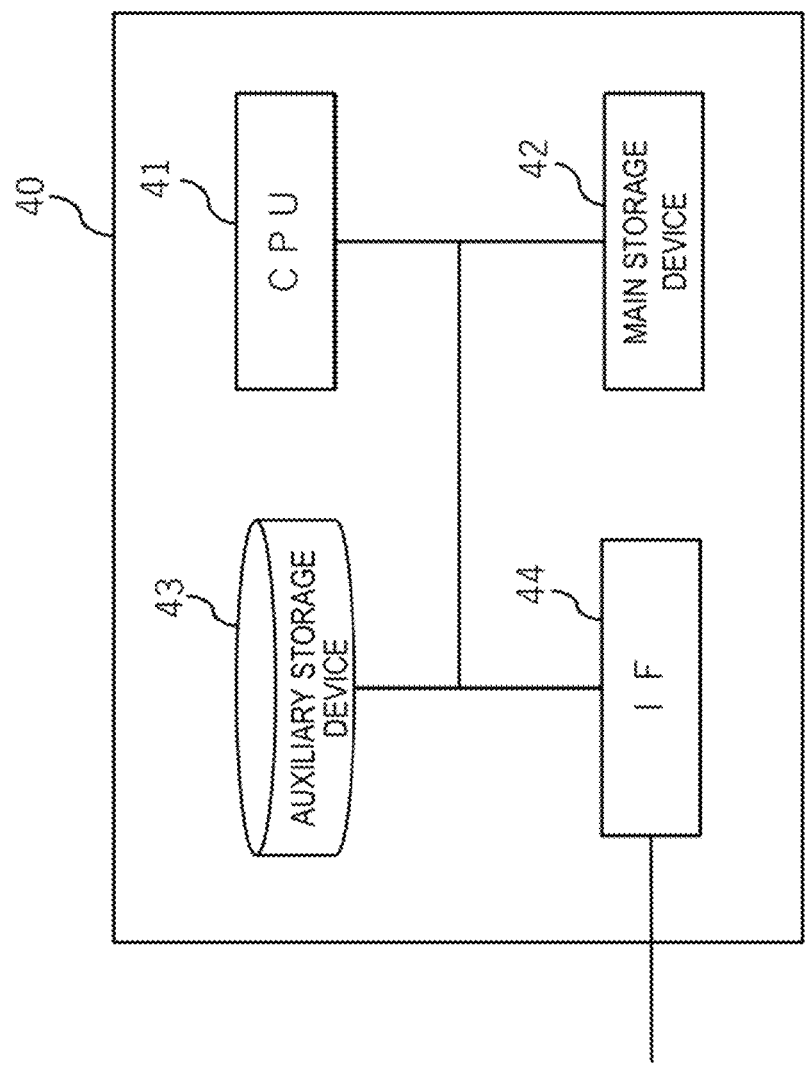
FIG. 9 is a drawing illustrating an example of a hardware configuration of the suspicious communication detection apparatus.

FIG. 9 is a drawing illustrating an example of a hardware configuration of the suspicious communication detection apparatus. An information processing apparatus (a computer) that adopts the hardware configuration illustrated in FIG. 9 is able to realize the above-described functions of the suspicious communication detection apparatus 10. The hardware configuration example illustrated in FIG. 9 is an example of the hardware configuration that realizes the functions of the suspicious communication detection apparatus 10 and does not limit the hardware configuration of the suspicious communication detection apparatus 10. The suspicious communication detection apparatus 10 may include hardware not illustrated in FIG. 9.

As illustrated in FIG. 9, a hardware configuration 40 that can be adopted by the suspicious communication detection apparatus 10 includes a CPU (Central Processing Unit) 41, a main storage device 42, an auxiliary storage device 43, and an IF (Interface) part 44, which are connected to each other via an internal bus, for example.

The CPU 41 executes individual instructions included in a program executed by the suspicious communication detection apparatus 10. The main storage device 42 is, for example, a RAM (Random Access Memory) and temporarily stores various kinds of programs so that the CPU 41 in the suspicious communication detection apparatus 10 can execute the programs.

The auxiliary storage device 43 is, for example, an HDD (Hard Disk Drive) and can store, for example, various kinds of programs executed by the suspicious communication detection apparatus 10 in the mid to long term. Various kinds of programs can be provided as a program product recorded in a non-transitory computer-readable storage medium. The auxiliary storage device 43 can be used to store various kinds of programs recorded in the non-transitory computer-readable storage medium in the mid to long term. The IF part 44 provides an interface relating to the communications performed by the suspicious communication detection apparatus 10.

An information processing apparatus that adopts the above-described hardware configuration 40 can realize the functions of the suspicious communication detection apparatus 10.

The above example embodiment can partially or entirely be described, but not limited to, as the following notes.

[Note 1]

A suspicious communication detection apparatus, including:
  a database in which information extracted from encrypted communications is managed separately as communications from an outside of an organization to an inside of the organization and as communications from the inside of the organization to the outside of the organization;
  a machine learning model that receives features of an encrypted communication and that determines whether the encrypted communication is a suspicious communication;
  a determination part that refers to the database by using information about a received encrypted communication, enters obtained features about the received encrypted communication to the machine learning model, determines whether the received encrypted communication is a suspicious communication, and stores the determination result for the suspiciousness in the database; and
  a redetermination part that performs, based on a determination result of an encrypted communication from the inside of the organization to the outside of the organization, a redetermination on a determination result of an encrypted communication from the outside of the organization to the inside of the organization, the determination result being stored in the database.

[Note 2]

The suspicious communication detection apparatus according to note 1;
  wherein the redetermination part compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;
  wherein, if the destination address and the source address match, the redetermination part determines that the encrypted communication from the outside of the organization to the inside of the organization is a suspicious communication; and
  wherein, if the destination address and the source address do not match, the redetermination part determines that the encrypted communication from the outside of the organization to the inside of the organization is not a suspicious communication.

[Note 3]

The suspicious communication detection apparatus according to note 1; wherein the database includes an encrypted communication information management table that manages session information about encrypted communications, an encrypted communication feature management table that manages features generated from encrypted communications, and an encrypted communication flag management table that manages flags of encrypted communications determined as suspicious communications.

[Note 4]

The suspicious communication detection apparatus according to note 3; wherein, regarding an encrypted communication from the outside of the organization to the inside of the organization, the encrypted communication having been determined as a suspicious communication, the determination part changes a flag in the encrypted communication flag management table.

[Note 5]

The suspicious communication detection apparatus according to note 3; wherein the encrypted communication feature management table manages features, which are a maximum value, a minimum value, an average value, a median value, and a cumulative total value of each of a transmission byte number, a reception byte number, a transmission packet number, a reception packet number, and a communication time, per combination of a source IP address, a destination IP address, and a destination port number.

[Note 6]

The suspicious communication detection apparatus according to note 3; wherein encrypted communications from the outside of the organization to the inside of the organization and encrypted communications from the inside of the organization to the outside of the organization are separately managed in the encrypted communication feature management table.

[Note 7]

A suspicious communication detection method, including:
  causing an information processing apparatus, which includes a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication is a suspicious communication, to refer to the database by using information about a received encrypted communication;
  causing the information processing apparatus to enter obtained features about the received encrypted communication to the machine learning model;
  causing the information processing apparatus to determine whether the received encrypted communication is a suspicious communication and to store the determination result for the suspiciousness in the database; and
  causing the information processing apparatus to perform, based on a determination result of an encrypted communication from the inside of the organization to the outside of the organization, a redetermination on a determination result of an encrypted communication from the outside of the organization to the inside of the organization, the determination result being stored in the database.

[Note 8]

The suspicious communication detection method according to note 7;
  wherein the information processing apparatus compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;
  wherein, if the destination address and the source address match, the information processing apparatus determines that the encrypted communication from the outside of the organization to the inside of the organization is a suspicious communication; and
  wherein, if the destination address and the source address do not match, the information processing apparatus determines that the encrypted communication from the outside of the organization to the inside of the organization is not a suspicious communication.

[Note 9]

A program, executed by an information processing apparatus, which includes a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication is a suspicious communication, the program including:
  referring to the database by using information about a received encrypted communication;
  entering obtained features about the received encrypted communication to the machine learning model;
  determining whether the received encrypted communication(s) is a suspicious communication and storing the determination result for the suspiciousness in the database; and
  performing, based on a determination result of an encrypted communication from the inside of the organization to the outside of the organization, a redetermination on a determination result of an encrypted communication from the outside of the organization to the inside of the organization, the determination result being stored in the database.

[Note 10]

The program according to note 9; wherein the performing of the redetermination includes comparing a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication, determining that the encrypted communication from the outside of the organization to the inside of the organization is a suspicious communication if the destination address and the source address match, and determining that the encrypted communication from the outside of the organization to the inside of the organization is not a suspicious communication if the destination address and the source address do not match.

If the present invention indicates an algorithm, software, a flowchart, or an automated process step, it is obvious that a computer is used. It is also obvious that the computer is provided with a processor and a memory or a storage device. Thus, even if these elements are not explicitly described, the present application should of course be deemed to include description of these elements.

The disclosure of the above PTL, etc., which have been referred to, is incorporated herein by reference thereto. Modifications and adjustments of the example embodiment and examples are possible within the scope of the overall disclosure (including the claims) of the present invention and based on the basic technical idea of the present invention. Various combinations and selections (including partial deletion) of various disclosed elements (including the elements in each of the claims, example embodiments, examples, drawings, etc.) are possible within the scope of the overall disclosure of the present invention. That is, the present invention of course includes various variations and modifications that could be made by those skilled in the art according to the overall disclosure including the claims and the technical idea. The specification discloses numerical value ranges. However, even if the specification does not particularly disclose numerical values or small ranges included in the ranges, these values and ranges should be deemed to have been specifically disclosed. In addition, as needed and based on the gist of the present invention, partial or entire use of the individual disclosed matters in the above literature, which has been referred to, as part of the disclosure of the present invention in combination with what is disclosed in the present application should be deemed to be included in what is disclosed in the present application.

REFERENCE SIGNS LIST 10 suspicious communication detection apparatus
11 determination part
12 redetermination part
13 machine learning model
14 encrypted communication database
10a to 10c, 10A to 10D information processing apparatus
40 hardware configuration
41 CPU
42 main storage device
43 auxiliary storage device
44 IF part

What is claimed is:

1. A suspicious communication detection apparatus comprising:
  a memory storing:
    a database in which information extracted from encrypted communications is managed separately as communications from an outside of an organization to an inside of the organization and as communications from the inside of the organization to the outside of the organization;
    a machine learning model that receives features of an encrypted communication and that determines whether the encrypted communication is a suspicious communication; and
    instructions; and
  a processor configured to execute the instructions to:
  refer to the database by using information about a received encrypted communication;
    enter obtained features about the received encrypted communication to the machine learning model;
    determine whether the received encrypted communication is a suspicious communication;
    store the determination result for the suspiciousness in the database; and
    perform, based on a determination result of an encrypted communication from the inside of the organization to the outside of the organization, a redetermination on a determination result of an encrypted communication from the outside of the organization to the inside of the organization, the determination result being stored in the database,
  wherein the database includes an encrypted communication information management table that manages session information about encrypted communications, an encrypted communication feature management table that manages features generated from encrypted communications, and an encrypted communication flag management table that manages flags of encrypted communications determined as suspicious communications.

2. The suspicious communication detection apparatus according to claim 1,
  wherein the processor compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;
  wherein, if the destination address and the source address match, the processor determines that the encrypted communication from the outside of the organization to the inside of the organization is a suspicious communication; and
  wherein, if the destination address and the source address do not match, the processor determines that the encrypted communication from the outside of the organization to the inside of the organization is not a suspicious communication.

3. The suspicious communication detection apparatus according to claim 1, wherein, regarding an encrypted communication from the outside of the organization to the inside of the organization, the encrypted communication having been determined as a suspicious communication, the processor changes a flag in the encrypted communication flag management table.

4. The suspicious communication detection apparatus according to claim 1, wherein the encrypted communication feature management table manages features, which are a maximum value, a minimum value, an average value, a median value, and a cumulative total value of each of a transmission byte number, a reception byte number, a transmission packet number, a reception packet number, and a communication time, per combination of a source IP address, a destination IP address, and a destination port number.

5. The suspicious communication detection apparatus according to claim 1, wherein encrypted communications from the outside of the organization to the inside of the organization and encrypted communications from the inside of the organization to the outside of the organization are separately managed in the encrypted communication feature management table.

6. A suspicious communication detection method comprising:
  causing an information processing apparatus, which includes a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication is a suspicious communication, to refer to the database by using information about a received encrypted communication;

causing the information processing apparatus to enter obtained features about the received encrypted communication to the machine learning model;

causing the information processing apparatus to determine whether the received encrypted communication is a suspicious communication and to store the determination result for the suspiciousness in the database; and causing the information processing apparatus to perform, based on a determination result of an encrypted communication from the inside of the organization to the outside of the organization, a redetermination on a determination result of an encrypted communication from the outside of the organization to the inside of the organization, the determination result being stored in the database, wherein the database includes an encrypted communication information management table that manages session information about encrypted communications, an encrypted communication feature management table that manages features generated from encrypted communications, and an encrypted communication flag management table that manages flags of encrypted communications determined as suspicious communications.

7. The suspicious communication detection method according to claim 6, wherein the information processing apparatus compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;

wherein, if the destination address and the source address match, the information processing apparatus determines that the encrypted communication from the outside of the organization to the inside of the organization is a suspicious communication; and wherein, if the destination address and the source address do not match, the information processing apparatus determines that the encrypted communication from the outside of the organization to the inside of the organization is not a suspicious communication.

8. The suspicious communication detection method according to claim 6, wherein, regarding an encrypted communication from the outside of the organization to the inside of the organization, the encrypted communication having been determined as a suspicious communication, the information processing apparatus changes a flag in the encrypted communication flag management table.

9. The suspicious communication detection method according to claim 6, wherein the encrypted communication feature management table manages features, which are a maximum value, a minimum value, an average value, a median value, and a cumulative total value of each of a transmission byte number, a reception byte number, a transmission packet number, a reception packet number, and a communication time, per combination of a source IP address, a destination IP address, and a destination port number.

10. The suspicious communication detection method according to claim 6, wherein encrypted communications from the outside of the organization to the inside of the organization and encrypted communications from the inside of the organization to the outside of the organization are separately managed in the encrypted communication feature management table.

11. A non-transitory computer readable medium storing a program executable by an information processing apparatus to perform processing, the information processing apparatus including a database in which information extracted from encrypted communications is managed separately as communications from an outside of an organization to an inside of the organization and as communications from the inside of the organization to the outside of the organization and a machine learning model that receives features of an encrypted communication and that determines whether the encrypted communication(s) is a suspicious communication, the processing comprising:

referring to the database by using information about a received encrypted communication;

entering obtained features about the received encrypted communication to the machine learning model;

determining whether the received encrypted communication is a suspicious communication and storing the determination result for the suspiciousness in the database; and performing, based on a determination result of an encrypted communication from the inside of the organization to the outside of the organization, a redetermination on a determination result of an encrypted communication from the outside of the organization to the inside of the organization, the determination result being stored in the database, wherein the database includes an encrypted communication information management table that manages session information about encrypted communications, an encrypted communication feature management table that manages features generated from encrypted communications, and an encrypted communication flag management table that manages flags of encrypted communications determined as suspicious communications.

12. The non-transitory computer readable medium storing the program according to claim 11, wherein the performing of the redetermination includes comparing a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication, determining that the encrypted communication from the outside of the organization to the inside of the organization is a suspicious communication if the destination address and the source address match, and determining that the encrypted communication from the outside of the organization to the inside of the organization is not a suspicious communication if the destination address and the source address do not match.

13. The non-transitory computer readable medium storing the program according to claim 11, wherein, regarding an encrypted communication from the outside of the organization to the inside of the organization, the encrypted communication having been determined as a suspicious communication, the information processing apparatus changes a flag in the encrypted communication flag management table.

14. The non-transitory computer readable medium storing the program according to claim 11, wherein the encrypted communication feature management table manages features, which are a maximum value, a minimum value, an average value, a median value, and a cumulative total value of each of a transmission byte number, a reception byte number, a transmission packet number, a reception packet number, and a communication time, per combination of a source IP address, a destination IP address, and a destination port number.

15. The non-transitory computer readable medium storing the program according to claim 11, wherein encrypted communications from the outside of the organization to the inside of the organization and encrypted communications from the inside of the organization to the outside of the organization are separately managed in the encrypted communication feature management table.

* * * * *